March 3, 1942. W. E. WOODARD 2,275,277
LOCOMOTIVE POWER REVERSE GEAR EQUIPMENT
Filed July 28, 1939 3 Sheets-Sheet 1
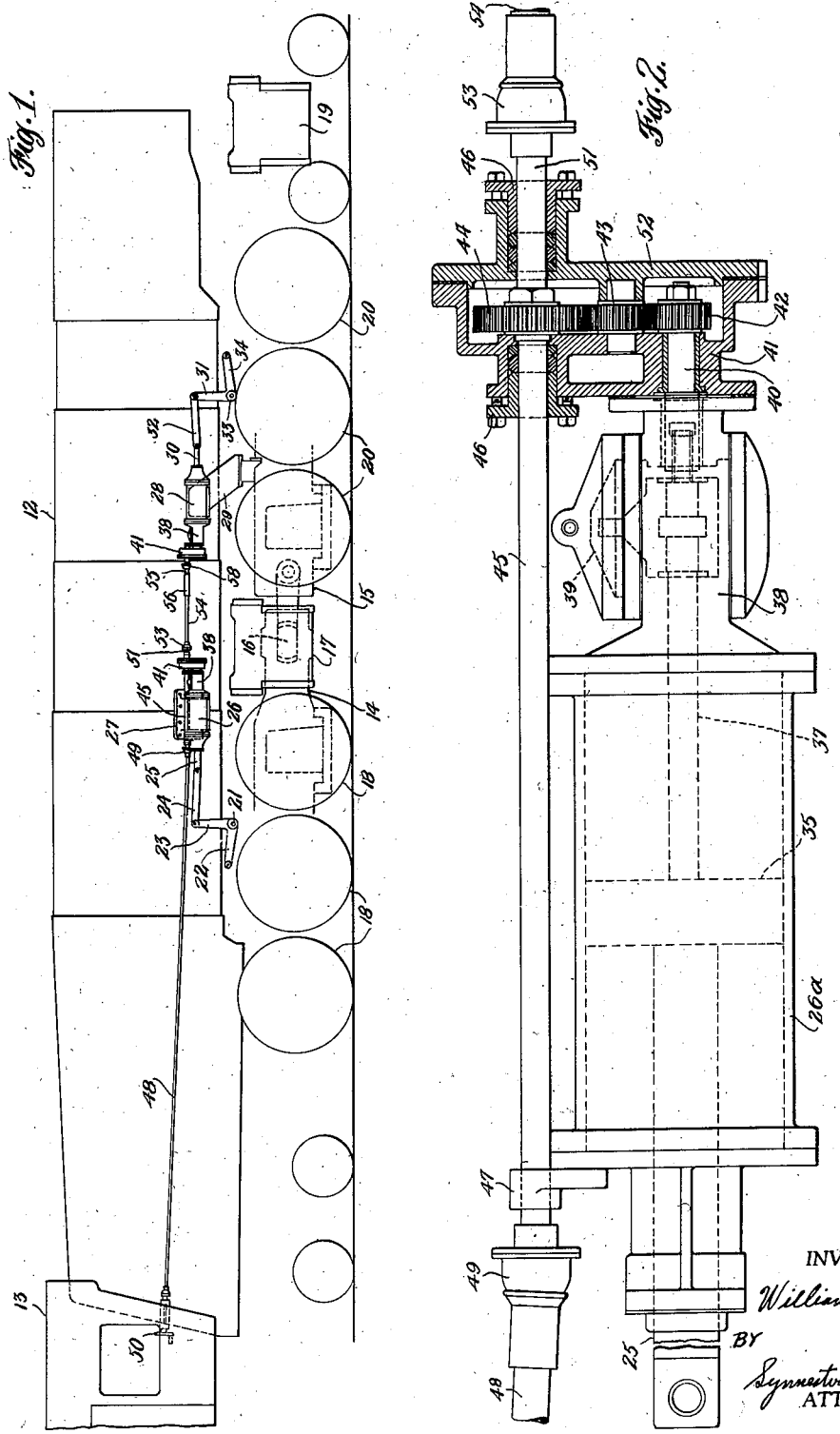
INVENTOR.
William E. Woodard
BY
Synnestvedt & Lechner
ATTORNEYS March 3, 1942.   W. E. WOODARD   2,275,277
LOCOMOTIVE POWER REVERSE GEAR EQUIPMENT
Filed July 28, 1939   3 Sheets-Sheet 2

INVENTOR:
William E. Woodard
BY
Symnestvedt & Lechner
ATTORNEYS.

INVENTOR:
William E. Woodard
BY
Synnestvedt + Lechner
ATTORNEYS.

Patented Mar. 3, 1942

2,275,277

UNITED STATES PATENT OFFICE 2,275,277

LOCOMOTIVE POWER REVERSE GEAR EQUIPMENT

William E. Woodard, Forest Hills, N. Y.

Application July 28, 1939, Serial No. 287,157

16 Claims. (Cl. 105—48)

This invention relates to locomotive power reverse gear equipment, and is especially concerned with a novel arrangement of operating or controlling mechanism for power reverse gears.

One of the principal objects of the invention is the provision of operating mechanism permitting great flexibility in the matter of locating or positioning power reverse gears, either where the locomotive is equipped with a single gear or with a plurality thereof.

To this end the invention provides a compact adapter unit constructed to be interposed between and to interconnect the gear and the operating shaft therefor in a plurality of different positions and arrangements of the gear and shaft. Thus a plurality of different positions of reverse gear installation may readily be accommodated, without change in the construction of the reverse gear itself.

Many features of the invention, moreover, are especially suitable to locomotives having a plurality of power reverse gears associated with the valve motion for different sets of cylinders. In the multiple type of installation, the invention provides for the use of substantially direct-line operating shafting for common control of the several power reverse gears. Such direct-line shafting is of substantial importance since it eliminates offsets, joints, levers, etc., in the operating mechanism.

In accordance with the invention, moreover, provision is made for use of the direct-line control shafting, with any one of a number of different relative positions of the several power reverse gears.

The foregoing and other features and advantages will appear more fully from the following description referring to the accompanying drawings, in which—

Figure 1 is an outline side view of a portion of a locomotive having a plurality of sets of driving cylinders and wheels, and equipped with a power reverse gear installation in accordance with the present invention;

Figure 2 is an enlarged side elevational view of the rear reverse gear shown in Figure 1, with certain parts shown in longitudinal section;

Figure 3:
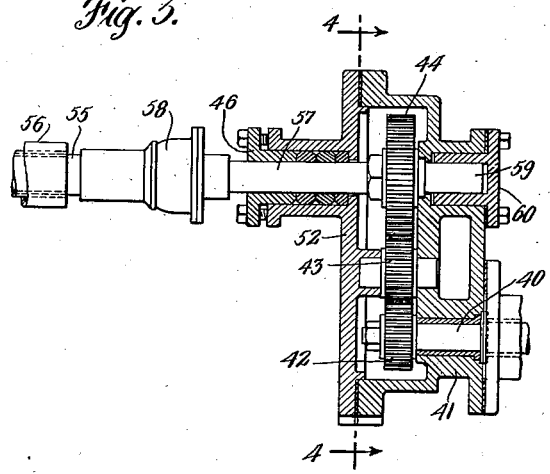
Figure 3 is an enlarged longitudinal sectional view through parts of the mechanism associated with the forward reverse gear of Figure 1, this view being taken as indicated by the section line 3—3 on Figure 4.

Figures 6 to 11 inclusive are diagrammatic illustrations of various reverse gear arrangements with which the mechanism of the invention is adapted to cooperate.

The outline of the locomotive boiler appears at 12 in Figure 1, the cab being shown at 13. The locomotive here shown is of the articulated type having main and supplemental frames, adjacent end portions of which are shown at 14 and 15, articulated as at 16. A pair of cylinders 17 serves to drive a set of wheels 18 which are journalled in the main frame, and a set of cylinders 19 cooperates with drivers 20 which are journalled in the supplemental frame 15.

The valves associated with cylinders 17 are provided with a valve motion mechanism, the parts of which are not shown in Figure 1 except for the reverse shaft 21 having lifting arms one of which appears at 22, adapted to alter the position of the link blocks in the usual links. The reverse shaft lever 23 is connected by means of reach rod 24 with the piston rod 25 projecting from one end of the cylinder of the power reverse gear 26, which latter is mounted on the boiler by a bracket 27.

Similarly, for the forward driving mechanism, a power reverse gear 28 is provided, this being mounted by a bracket 29 on the supplemental articulated frame 15. The piston rod 30 of this gear is connected with the reverse shaft lever 31 by link 32, and as before, the reverse shaft 33 carries lifting arms such as shown at 34, adapted to be coupled with the valve motion for the valves of the forward cylinders 19.

As better seen in Figure 2 (illustrating the reverse gear installation for the rear engine unit), the power reverse gear may be of a suitable available type, such for example as the "Precision" type, incorporating a cylinder 26a in which the piston 35 works, the piston rod 25 extending from the left end of the cylinder. (Further illustration of such a standard gear will be found at page 627 of the Locomotive Cyclopedia, 1930 edition.)

The adjusting or lead screw 37 is threaded into the piston 35 and extends toward the right into the valve housing 38 for the control valve 39. The screw 37 is adapted to be rotated by the actuating shaft 40 which projects at the right of the valve housing and which is journalled in the adapter housing 41. The adapter housing also serves as a case for gearing including pinion 42 mounted on shaft 40, idler 43 and driving gear 44, the latter being fixed to the control or operating shaft 45 forming a part of the shafting which extends rearwardly from the gear into the cab of the locomotive. Shaft 45 may be journalled as by a flanged bushing 46, serving as a part of a stuffing-box, and by a bracket 47.

As seen in Figures 1 and 2, the rear extension 48 of the control shafting is coupled with shaft 45 by means of the universal 49. The shafting may be rotated by any suitable means, such as the manually operable wheel 50 in the cab.

Shaft 45 also has a forward extension 51 which projects through the closure 52 for the adapter housing, this shaft extension 51 being coupled by universal 53 with another section of shaft 54 projecting forwardly toward the reverse gear 28 for control thereof. Another flanged bushing 46 constituting the packing gland of a stuffing-box serves as a bearing for shaft extension 51.

The packing glands associated with shaft 45 and shaft extension 51 prevent loss of pressure from the valve chamber 38 of the reverse gear through the adapter housing.

Shaft 54, in turn, is coupled with shaft 55 (see Figures 1 and 3) by a slip joint 56. The operating or control shaft 57 for the forward gear is connected to shaft 55 by another joint 58, the joints 53, 56 and 58 being provided to accommodate relative angling of the main and supplemental frames 14 and 15, as when running on curved track.

As will readily be seen from inspection of Figure 3, the gearing arrangements in the adapter housing 41 for the forward reverse gear are the same as described above, although the parts appear in inverted positions since the forward reverse gear is turned end for end in comparison with the rear gear. The control shaft member 57 passes through a bushing 46, and the forwardmost extension 59 of the control shafting is journalled in a bushing formed as a part of a cap 60 which takes the place of one of the bushings 46 as required in the rear unit of Figure 2.

Notwithstanding the axially inverted positions of the two reverse gears shown in Figure 1, the adapter means, including the casing part 41, the closure member 52 and the gearing (42, 43 and 44) is the same for each of the power reverse gears. Only one small part need be different in these two installations, i. e., the rear installation requires the flanged bushing and packing device 46 for shaft 45, and the forward installation the bushing-and-cap device 60 for shaft 59.

Figure 4:
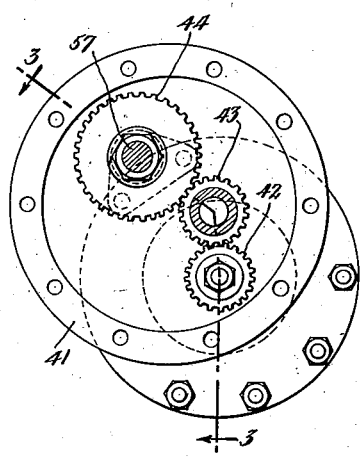
Figure 4 is a transverse sectional view taken as indicated by the line 4—4 on Figure 3.

However, the adapter devices 41 for the two reverse gears are mounted in different angular positions with respect to the control valve casings 38 for the two gears, the reason for which will appear from inspection of Figure 4. As there shown the adapter unit for the forward gear is mounted in a position in which the axis of shaft 57 is offset to the left from the longitudinal vertical mid plane through the gear. Were the adapter unit for the other gear (which is axially inverted) to be mounted on the control valve housing in the same relation, the sections of operating shafting associated with the two gears would not fall in axial alignment. Therefore, the adapter for one gear is turned about the axis of the gear cylinder (the axis of shaft 40) to bring the axes of the two driving gears 44 into alignment, thereby permitting use of the direct-line operating shafting herein contemplated.

In a multiple arrangement of the type shown in Figure 1, wherein the two gears are axially inverted, it may also be necessary to employ adjusting screws 37 having opposite threading. This, however, may readily be done, since standard power reverse gears of this type are optionally provided with right or left hand adjusting screws.

Figure 5:
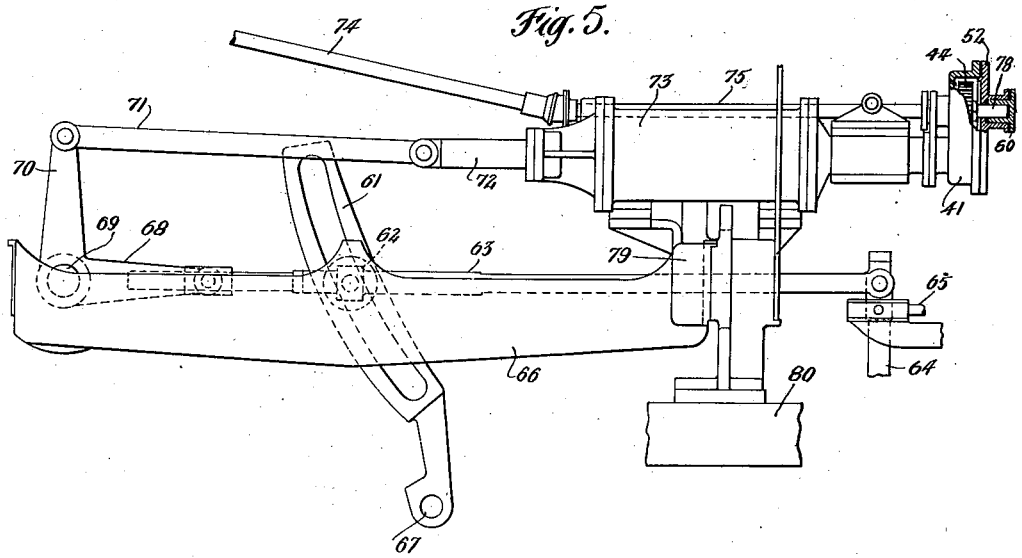
Figure 5 is a side elevational view of a modified installation.

Figure 5 illustrates a modified installation in which only a single set of cylinders, valve motion and reverse gear is employed. Here there are shown parts of the valve motion including the link 61, link block 62, radius rod 63, combining lever 64, and valve stem 65. The link is mounted on the support 66 for oscillation about its center, the same being operated by the usual eccentric rod (not shown) which is pivoted to the link tail at 67.

Adjustment of the block 62 may be obtained by the lifting arm 68 (one such arm being provided for the valve motion parts for each cylinder) mounted on reverse shaft 69, which is operated by the lever 70. Lever 70, in turn, is coupled by link 71 with the piston rod 72 projecting from the cylinder of reverse gear 73. The control shafting 74—75 for the reverse gear is arranged similarly to Figure 1, this control shafting being coupled with the adjusting screw for the gear through an adapter 41 as before. In this installation the adapter closure 52 is provided with a cap 60 having a bearing bushing cooperating with shaft extension 78.

With regard to the showing of Figure 5, note especially that the reverse gear 73 is mounted substantially directly on the bracket or support 79 which also carries support 66 for the valve motion parts and which still further serves as a means of support for the crosshead guide 80. Thus, support in common is provided for the reverse gear and valve motion parts actuated thereby, whereby alignment thereof is assured and at the same time a saving of weight may be secured.

The adapter means of the present invention, incorporating gearing for coupling the operating shaft with the actuating element for the gear is adaptable for use in almost any single or multiple reverse gear installation. This will further appear from comparison of the several diagrams of Figures 6 to 11, showing both single and multiple reverse gear installations of various types. In these figures the gear appears at $a$, the control shafting at $b$, the adapter at $c$, and the connection to the valve motion at $d$.

Figure 6:
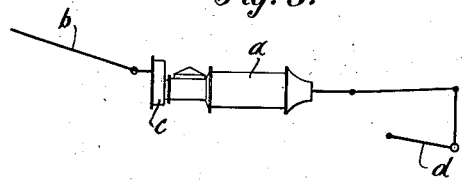
Figure 7:
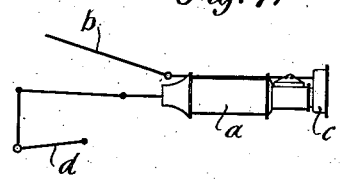
Figure 8:
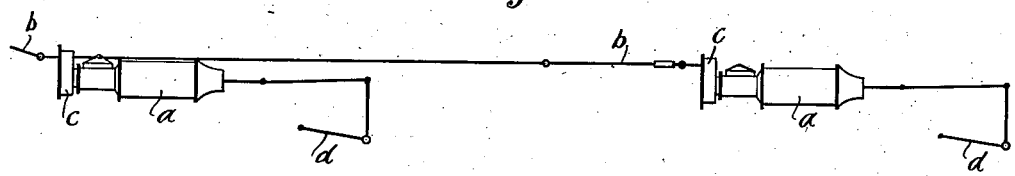

In the first two of these diagrams only a single reverse gear is involved in the installation, the arrangement of Figure 6 being one in which the operating shafting approaches the gear at the control valve end. In the arrangement of Figure 7 the gear is axially inverted, so that both the control shafting $b$ and the connection to the valve motion $d$ extend from the end of the gear opposite its control valve.

Figure 9:
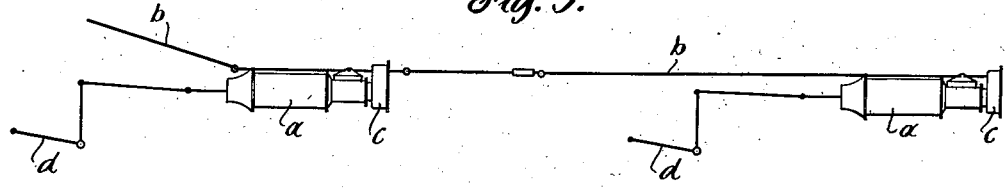
Figure 10:
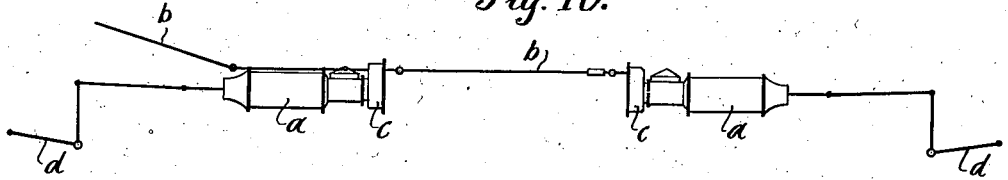
Figure 11:
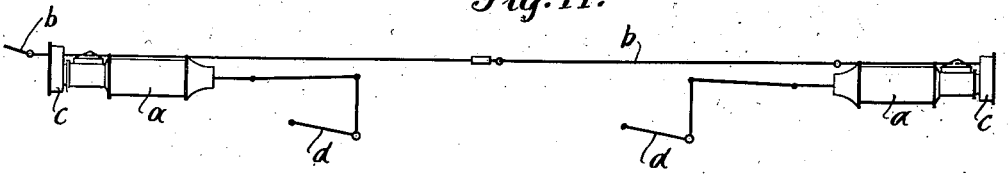

Figures 8 to 11 show various double arrangements, in the first of which the two gears are positioned generally in alignment, and in the same axial position as in Figure 6. In Figure 9, both gears appear in the position of Figure 7. In Figure 10, the two gears are positioned between the two valve motions, the piston rod connections for the valve motions being extended away from each other in opposite directions. Finally, in Figure 11, there is illustrated an installation in which the adjustable parts of the two valve motions are positioned relatively close to each other and with the reverse gear piston rods projecting toward each other.

In all of these arrangements, the same adapter unit is employed to accommodate the different reverse gear and operating shaft positions. Only a few small auxiliary parts need be substituted in certain installations.

In the multiple arrangements of Figures 8 to 11, in addition to the foregoing advantages, the invention makes possible operation of both reverse gears from a common control shafting. Still further, the control shafting in the multiple arrangements is of the direct-line type, not requiring offsets in control connections to pass the gears. Especially in the multiple arrangements, and also in the arrangement of Figure 7, the invention provides a convenient means for coupling the control shafting with the actuating element for the gear or gears, notwithstanding the fact that the actuating element is arranged generally axially of the gear cylinder.

While the ratio of the gearing in the adapter may be different in different installations, it is desirable to use a step-up gearing (for example: 1 to 2 or 1 to 3, between the manually rotated shaft and the screw shaft in the reverse gear), in conjunction with a relatively low-pitch thread on the screw 37 of the reverse gear. An example of a suitable screw is one of 1½" diameter, with a thread making four turns per inch axial length. By using a low-pitch screw, self-locking of the screw is assured, i. e. locking as against rotation thereof under the effect of pressure or load applied in the direction of the axis of the screw, thus preventing creeping of the reverse gear and transmission of forces from the valve motion back through the gear to the control organ in the cab; while at the same time the step-up action of the spur gears in the adapter preserves the possibility of rapid adjustment of the valve motion.

From the foregoing description it will be apparent how the structure of the present invention accomplishes the various objects and advantages set out at the beginning of the specification, and it will be obvious that various changes in number, size, configuration and arrangement of the parts may be made, within the scope of the appended claims, while still securing the advantages of the invention.

I claim:

1. In a locomotive having a plurality of sets of driving cylinders with separate valve motions associated therewith, a separate power reverse gear for each motion, the gears having operating cylinders generally in alignment with each other, and substantially direct-line manually operable control shafting common to the gears arranged with its axis passing the gears at a side thereof, the several gears being coupled to said shafting for independent response to adjustments of the latter.

2. In a locomotive having a plurality of sets of driving cylinders with separate valve motions associated therewith, a separate power reverse gear for each motion, the gears being disposed one ahead of the other lengthwise of the locomotive and each gear having an actuating connection disposed generally axially thereof, substantially direct-line manually operable control shafting for the gears arranged with its axis passing the gears at a side thereof, and means operatively connecting the actuating connection for each gear with said shafting.

3. In a locomotive having a plurality of sets of driving cylinders with separate valve motions associated therewith, a separate power reverse gear for each motion, the gears being disposed one ahead of the other at the same side of the locomotive boiler, substantially direct-line manually rotatable control shafting for the gears arranged with its axis passing the gears at a side thereof, and bearing means on at least one of said gears for mounting the shafting.

4. In a locomotive having a plurality of sets of driving cylinders with separate valve motions associated therewith, a separate power reverse gear for each motion, the operating cylinders for the gears being disposed generally in alignment with each other and each gear having a rotative actuating connection arranged generally axially of its operating cylinder, substantially direct-line manually rotatable control shafting for the gears arranged with its axis passing the gears at a side thereof, and means for coupling each of said actuating connections with the control shafting.

5. In a locomotive having a plurality of sets of driving cylinders with separate valve motions associated therewith, a separate power reverse gear for each motion, the gears being disposed generally in alignment one ahead of the other and each gear having a rotative actuating connection arranged generally axially of its operating cylinder, substantially direct-line manually rotatable control shafting for the gears arranged with its axis passing the gears at a side thereof, and means for coupling each of said actuating connections with the control shafting, the coupling means incorporating gearing for stepping up rotation of the actuating connection as compared with that of the operating shafting.

6. In a locomotive having two sets of driving cylinders with separate valve motions associated therewith, a separate power reverse gear for each motion, the operating cylinders for the gears being disposed generally in alignment with each other and each gear having an actuating connection disposed generally axially thereof, the operating cylinders and actuating connections for the two gears being axially inverted with respect to each other, substantially direct-line manually operable control shafting for the gears arranged with its axis passing the gears at a side thereof, and means operatively connecting the actuating connection for each gear with said shafting.

7. In a locomotive having a plurality of sets of driving cylinders with separate valve motions associated therewith, a separate power reverse gear for each motion, the operating cylinders for the gears being disposed generally in alignment with each other and each gear having an actuating connection disposed generally axially thereof, the actuating connections for the two gears projecting therefrom in the same axial direction, substantially direct-line manually operable control shafting for the gears arranged with its axis passing the gears at a side thereof, and means operatively connecting the actuating connection for each gear with said shafting.

8. For locomotive power reverse gear equipment incorporating an operating cylinder, a piston responsively subject to compressed air, control means for said piston including an air-control valve, and an actuating connection therefor disposed generally axially of the cylinder, and an operating shaft arranged with its axis passing the cylinder approximately in parallelism with the axis thereof, an adapter device incorporating coupling means for interconnecting the actuating connection and the operating shaft, the adapter device being arranged to cooperate with an operating shaft extended therefrom in either direction generally lengthwise of the gear.

9. For locomotive power reverse gear equipment incorporating an operating cylinder, control means therefor having an actuating connection disposed generally axially of the cylinder, and an operating shaft arranged with its axis passing the cylinder at a side thereof, an adapter device incorporating coupling means for interconnecting the actuating connection and the operating shaft, the adapter device being adapted to be mounted in association with the gear in different angular positions whereby to cooperate with an operating shaft located in different positions circumferentially around the gear cylinder.

10. For a locomotive engine reversing installation having power reverse gear means and operating shafting generally paralleling the same, an adapter mechanism comprising a motion-transmitting interconnection between said means and said shafting and further including readily replaceable shafting supports for alternatively accommodating a through shaft and a shaft terminating at the adapter.

11. For a locomotive engine reversing installation having power reverse gear means and operating shafting, an adapter unit comprising gearing for interconnecting said means and shafting and having mounting means adapted to cooperate with the reverse gear in different positions to accommodate differences in the relative position of the reverse gear and shafting.

12. The combination with a power reverse gear having an adjusting screw of a pitch which is self-locking against rotation under axial load, and an operating shaft therefor, of an adapter configured to connect said shaft to said screw in either of a plurality of positions relative to said reverse gear, and including step-up gearing for effecting rapid adjustment of said self-locking screw.

13. In a locomotive with two sets of cylinders having separate valve motion mechanisms, a separate power reverse gear for each of said mechanisms, a manually rotatable adjusting connection extending to both of said power reverse gears for adjusting them in common, and a slip joint in said connection between said power reverse gears.

14. In a locomotive with two sets of cylinders having separate valve motion mechanisms, a separate power reverse gear for each of said mechanisms, a manually rotatable adjusting connection extending to both of said power reverse gears for adjusting them in common, and for each of said reverse gears a train of gearing operatively coupling same to said adjusting connection.

15. In a locomotive having a plurality of sets of driving cylinders with separate valve motions associated therewith, a separate power reverse gear for each motion, the gears being disposed generally in alignment one ahead of the other and each gear having a rotative actuating connection arranged generally axially of its operating cylinder comprising an adjusting screw of a pitch which is self-locking against rotation under axial load, manually rotatable control shafting for the gears arranged non-concentrically with relation to the gears, and means for coupling each of said actuating connections with the control shafting, the coupling means incorporating gearing for stepping up rotation of the actuating connection as compared with that of the control shafting.

16. In a locomotive with two sets of cylinders having separate valve motion mechanisms, a separate power reverse gear for each of said mechanisms, an adjusting connection controllable from the locomotive cab and extending to both of said power reverse gears for adjusting them in common, and separable coupling means for effecting an independent operative coupling of each of said reverse gears to said adjusting connection.

WILLIAM E. WOODARD.